April 16, 1963     B. G. FORMAN     3,086,072
NON-CONDUCTIVE FASTENERS

Filed March 31, 1959                                  2 Sheets-Sheet 1

BENJAMIN G. FORMAN
INVENTOR

BY Joseph Blacker
ATTORNEY

April 16, 1963 B. G. FORMAN 3,086,072
NON-CONDUCTIVE FASTENERS
Filed March 31, 1959 2 Sheets-Sheet 2

BENJAMIN G. FORMAN
INVENTOR

BY *Joseph Blacker*

ATTORNEY

United States Patent Office
3,086,072
Patented Apr. 16, 1963

3,086,072
NON-CONDUCTIVE FASTENERS
Benjamin G. Forman, Kew Gardens, N.Y., assignor to Formar Industries, Inc., Chicago, Ill., a corporation of Illinois
Filed Mar. 31, 1959, Ser. No. 803,222
1 Claim. (Cl. 174—138)

This application is a substitute of my prior application, Serial No. 143,793, filed February 11, 1950, now abandoned, entitled "Socket Head Non-Conductive Fastener."

This invention relates to non-conductive fasteners or screws having socket heads.

In my patent for non-conductive fastener No. 2,432,986, I have disclosed a screw head wherein the head portion is slotted for the purpose of driving, and in practice it is found that the depth of the slot is about one-half the height of the head.

In the production of an all metal screw having a socket head, the depth of the recess in the head is controlled by the limitation to which the recess may be extruded in a solid rod for engagement with a driving tool. In practice, it is found that the depth of the recess is limited due to practical difficulties, and the maximum depth of the recess is less than the heihgt of the head.

In practice it is also found that when a socket head screw is threaded and unthreaded a great number of times, that the walls defining the socket in the head get worn out and the driving tool slips.

In the disclosure herewith, the composite non-conductive fastener is made with a hollow core which is co-extensive with the length of the screw, and it is possible to make the length of the grip surface for the driving tool at least one-half the length of the screw. Accordingly, the driving portion of the screw cannot wear out and there cannot develop a situation where the recess is worn out to such an extent that the fastener becomes useless for practical purposes.

It is also found that when a hollow core is used, that the material extruded moves sideways into and becomes additionally bonded to the comparatively soft plastic covering body and that the interengagement thus formed between the hollow metal core and the plastic body is sufficient to withstand the maximum driving torque imposed upon the fastener or screw in practice. The bond due to the serration embedment is augmented by the expansion of the hollow core against the plastic covering when the core is under pressure in the formation of the socket.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

In the illustrated embodiment of the invention, the numeral 10 indicates an elongated composite non-conductive bar having a hollow metal core 11 throughout its length. The bar 10 has an outer covering layer 12 of non-conductive plastic material.

Figure 2:
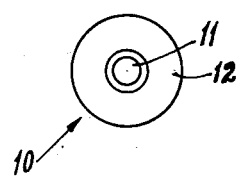
FIGURE 2 is a top plan view of the composite bar shown in FIGURE 1.
Figure 3:
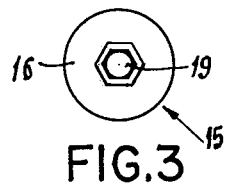
FIGURE 3 is a top plan view of a composite socket head screw made from the composite bar shown in FIGURES 1 and 2.
Figure 1:
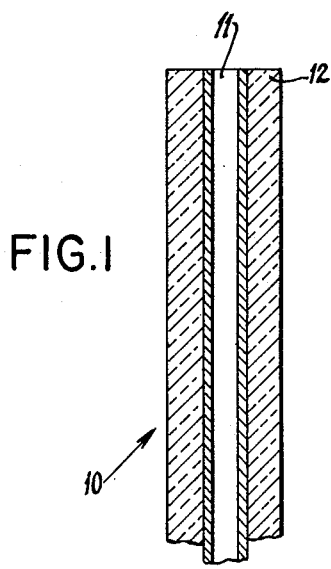
FIGURE 1 is a central cross-sectional view of a hollow non-conductive composite bar having an insulated metal core and from which bar the threaded fasteners are fabricated.
Figure 4:
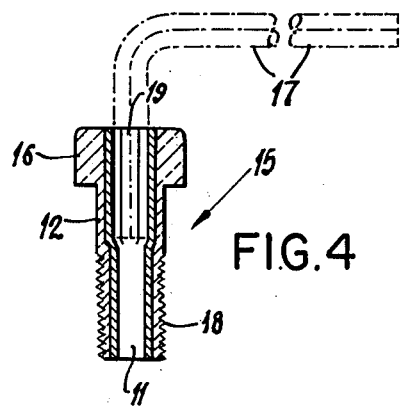
FIGURE 4 is a central cross-sectional view of the composite socket head screw.
Figure 5:
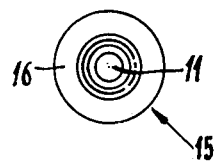
FIGURE 5 is a bottom plan view of the screw shown in FIGURES 3 and 4.

FIGURES 3 to 5 inclusive show a threaded fastener or screw 15 made from the composite bar 10. In the embodiment shown, the fastener 15 has a socket-shaped head 16 of hexagonal shape which is made by extruding the metal into the plastic material. The fastener 15 has a thread 18 on its outer periphery.

The outer layer of plastic material 12 is bonded to the hollow metal core 11 by molecular adhesion during molding due to the shrinkage of the plastic material, and by the holding power due to the bond formed by the extruded metal into the plastic material at the hexagonal edges of the hexagonal socket 19.

As shown in FIGURE 4, it will be seen that the diameter of the metal core 11 is substantially one-half the diameter of the body 12 of the screw 15. Inasmuch as it is well known that steel has a compressive strength many times that of plastic material it follows that the metal core has sufficient strength to absorb the stress developed by a driving means, such as a socket wrench 17, without undue stressing or breaking the outer plastic layer.

Figure 6:
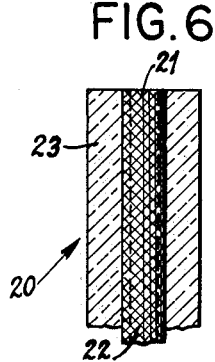
FIGURE 6 is a central cross-sectional view of a modified composite bar.

FIGURE 6 shows a modified composite bar 20 wherein the metal core 21 has serrations 22 throughout its length, the metallic serrations being embedded into the outer covering layer 23 and designed so that the outer and inner materials are united in intimate permanent union.

It is to be noted that the serrations 22 are formed by intersecting means forming localized surface serrations. These localized serrations are embedded into the outer covering layer and form localized bonding grips. At every portion of the plastic layer there are reinforcing metallic bonding grips, because both layers are of equal length when fabricated in screw form.

In practice I have found that when a threaded socket head screw is made in the composite form as shown in the drawings, that the union of the inner and outer members is such that not only is the outer covering of plastic material prevented from tearing apart lengthwise of the thread but that under twisting conditions the outer plastic material does not become separated from the inner metal core.

Under extreme service conditions the bond between the inner and outer layers is so strong as to prevent stretch or twist of the outer plastic material beyond its elastic limit and thus preventing the outer plastic layer from fracturing or tearing apart. The serrations 22 are angularly directed with respect to the horizontal and vertical axes; that is the serrations are multidirectional.

It is to be noted that the socket head type of composite screw shown herewith may be used for a feed-through electrical wire.

Figure 7:
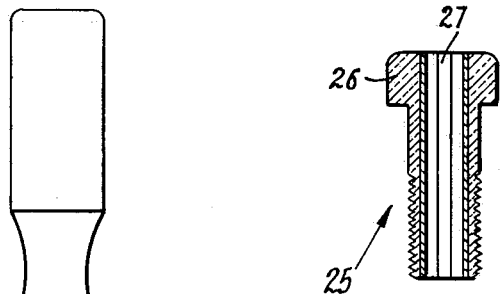
FIGURE 7 is a central cross-sectional view of a modified composite socket head screw.

FIGURE 7 shows a composite socket head screw 25 similar to the screw 15, and made in accordance with this invention but having a head 26 with the socket 27 extending through the screw.

Figure 8:
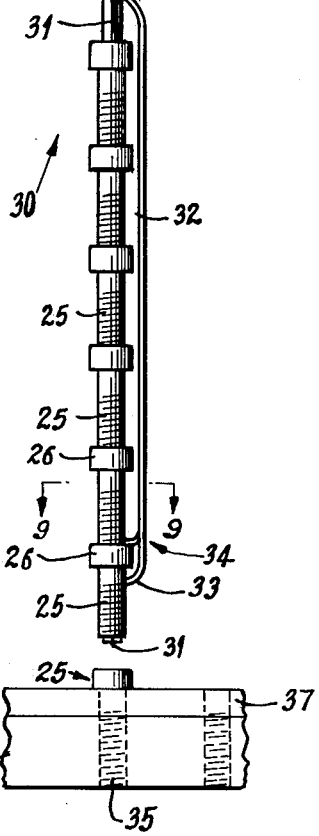
FIGURE 8 is a front elevation of a driving tool adapted for carrying a plurality of the composite screws shown in FIGURE 7 for successive threading of the screws.

FIGURE 8 is a front elevation of a driving tool 30 having a hexagonal shank 31 with walls arranged in angular relation with each other and on which are mounted a plurality of the screws shown in FIGURE 7.

Figure 9:
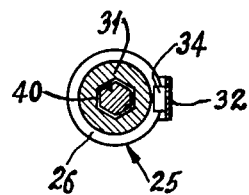
FIGURE 9 is a cross-sectional view taken on line 9—9 in FIGURE 8.
Figure 10:
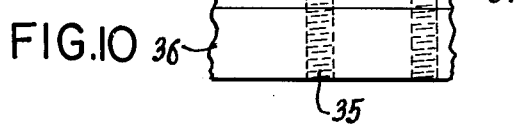
FIGURE 10 is a front view of a fragmentary portion of a work piece having a plurality of threaded apertures and showing the application of the driving tool shown in FIGURES 8 and 9.

As best shown in FIGURE 9, the dimensions of the screw socket 27 are made to freely fit the shank 31 of the driving tool 30. This permits a plurality of the screws 25 to be slidably supported in superimposed relation on the driving tool 30. An elongated leaf spring 32 is suitably secured to the upper portion of the driving tool, such as by welding. The lower portion of the leaf spring 32 has a laterally extending arm 33 which fits under the head 26 of the lower screw 25. An abutment member 34 is pressed out from the leaf spring 32 and is designed to engage the upper surface of the head 26.

In operation, the user mounts an extensive number of the screws 25 on the shank 31 and threads the lower screw into a threaded aperture 35 in a work piece 36, and thus secures the upper plate 37 to the work piece 36. When reaching a position where the head 26 comes close to the plate 37, the lower portion of the leaf spring is forced sideways out of the way, by the head 26 which permits complete threading in the required assembled relation. The operator may, however, manually move the driving tool 30 slightly upwardly to clear the head 26 before final seating of the screw head.

The superposed screw or screws 25 then fall down of their own weight. The operator may bend the lower portion of the leaf spring slightly sideways to permit the next higher screw to drop down below the abutment 34 to be gripped by the lower arm 33, in position for driving. It is to be noted that a clearance space 40 is provided between the outer surface of the shank 31 and the hexagonal surface of the socket 26, to permit quick downward movement of the screws to the driving position.

It is to be noted that in my Patent Number 2,432,986, I have disclosed a non-conductive fastener having a solid metal core. In the disclosure herewith, FIGURE 3 shows a socket type non-conductive fastener wherein the depth of the socket is limited, the socket extending part way into the core, the core being hollow throughout its length.

FIGURE 7 shows a socket type non-conductive fastener wherein the socket extends throughout the length of the screw and the length of the core, the core being hollow throughout its length.

For certain installations, I may provide a socket type non-conductive fastener wherein the metal core is solid and the socket extends only part way into the core, the remainder portion of the core remaining solid. This type of fastener or screw results when made on a screw machine, in which case the core is drilled for the formation of the hollow socket and the depth of the socket is less than the length of the screw.

In accordance with the patent statutes I have described and illustrated the preferred embodiment of my invention, but it will be understood that various changes and modifications can be made therein without departing from the spirit of the invention as defined by the appended claim.

I claim:

A composite non-conductive socket head screw comprising: a plastic non-conductive outer layer and a hollow co-extensive and sleeve-like reinforcing metal core, said core having an opening centrally thereof throughout its length, said screw having a non-conductive head and a threaded non-conductive body, said core being of a larger diameter through said head and through a portion of said body than through the threaded portion of said screw, said metal core being serrated throughout the length of said screw providing localized grips for bonding said plastic layer to said metallic core, said metal core extending through said plastic body to the outer end faces thereof, said hollow core being formed with walls arranged in angular relation with each other for engagement with a tool having walls arranged in angular relation with each other for driving said screw.

References Cited in the file of this patent

UNITED STATES PATENTS

| 1,087,024 | Lingo | Feb. 10, 1914 |
| 2,432,986 | Forman | Dec. 23, 1947 |
| 2,931,265 | De Lacy | Apr. 5, 1960 |

FOREIGN PATENTS

| 886,744 | France | July 12, 1943 |
| 1,055,981 | France | Oct. 21, 1953 |